March 17, 1942.   R. F. HORTON   2,276,777

BRAKING MECHANISM

Filed April 11, 1940

INVENTOR
ROGER F. HORTON
BY
George M. Soule
ATTORNEY

Patented Mar. 17, 1942

2,276,777

UNITED STATES PATENT OFFICE 2,276,777

BRAKING MECHANISM

Roger F. Horton, Cleveland Heights, Ohio

Application April 11, 1940, Serial No. 329,203

6 Claims. (Cl. 188—83)

This invention relates to a braking mechanism, especially for rotarily mounted unbalanced parts of machines and instruments, which parts require adustment into various positions about the center of rotation and which are apt to get out of adusted position by reason of the machine or instrument on which mounted being subected to vibration. The above indicates the general object.

An illustrative specific use of the invention is in connection with conventional multiple plate tuning condensers for radio instruments, etc., the rotary elements (plate assembly) of which condensers are unbalanced. Friction detents are commonly used to enable fine adjustment to be maintained. These frequently are found ineffective when the instrument is subjected to vibration, as when mounted on a motor vehicle (airplanes, boats or land vehicles) or in a region of heavy vehicular traffic, machine tool operations, etc.

A specific obect is to provide a simple and compact braking mechanism for purposes such as indicated above, which mechanism can be readily released as by operation of a knob or key held between the fingers and operatively connected to the part requiring adjustment, and which mechanism automatically becomes operative to effect braking upon release of such knob or key. For preventing unauthorized use of the instrument or machine to which the braking mechanism is applied, said mechanism may be made operable only upon insertion and turning of a key comparable to an ordinary door key, as will be more fully explained below.

Other objects and features of the invention will become apparent from the illustrative embodiments. While the mechanism is shown only in one general form and combined with a radio condenser and adjusting means therefor, it will be readily apparent that the principles of the invention can be embodied in other forms and combinations.

Figure 1:
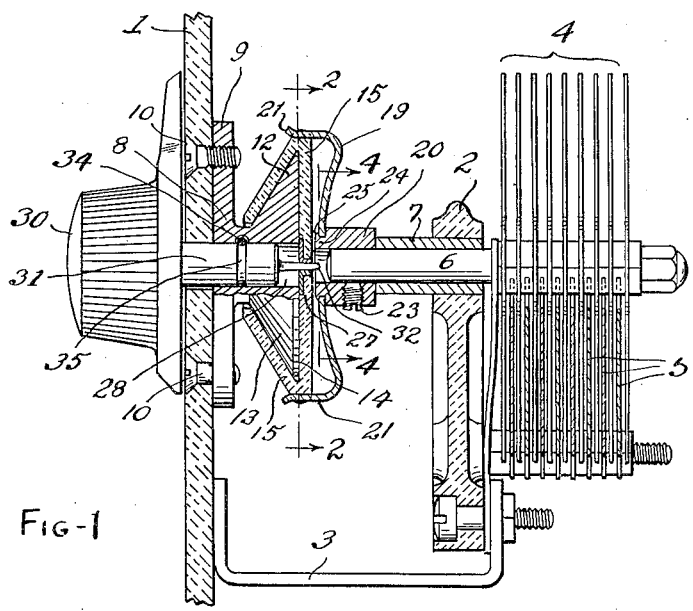
Figure 2:
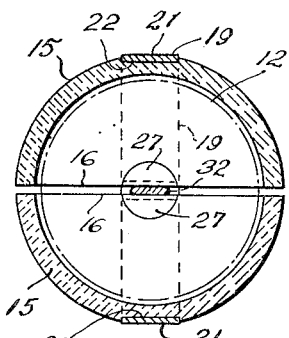
Figure 3:
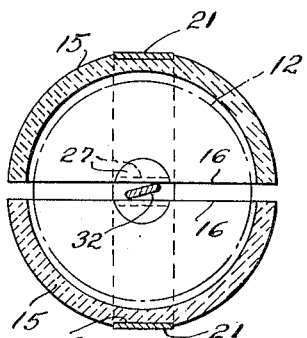
Figure 4:
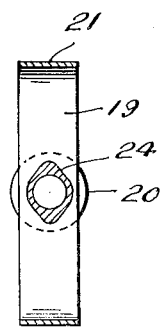
Figure 5:
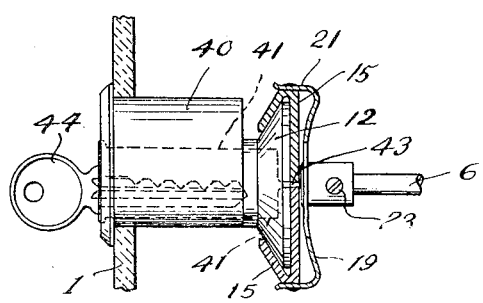

In the drawing, Fig. 1 is a central longitudinal sectional assembly view of a radio tuning condenser and operating means therefor, including the braking mechanism hereof in one form; Figs. 2 and 3 are transverse sectional views both taken as indicated at 2—2 on Fig. 1, Fig. 2 showing the rotary braking parts in braking position, and Fig. 3 showing said parts in releasing position; Fig. 4 is a detail sectional view as indicated by the line 4—4 on Fig. 1; and Fig. 5 is a fragmentary view on the order of Fig. 1, showing one manner in which the mechanism hereof can be controlled by a portable key of a conventional type of locking mechanism.

As shown in Fig. 1, an instrument panel 1 and a bracket 2 are connected as by suitable distance pieces, one of which is shown at 3, so that the parts mentioned constitute a supporting framework for the elements requiring relative adjustment and the adjusting means thereof. 4 and 5 represent respectively rotary and fixed assemblies of a multiple plate condenser, the rotary assembly being carried on a shaft 6 projecting through a bearing 7 of the bracket 2.

Aligned with the shaft 6 of the condenser plate assembly is a rigid tubular part 8 having, for instance, a flange 9 for the purpose of securing it (e. g.) to the panel 1 as by screws 10. Opposite the flange the part 8 has a head 12 which serves as a brake drum and which is preferably of frusto-conical form, providing a conical braking surface 13 and a flat braking surface 14. Cooperating with the fixed braking surfaces are a pair of operatively identical shoe elements 15, the inner or relatively adjacent surfaces of which are generally complementary to the surfaces 13 and 14. The shoes are semicircular pieces and with closely adjacent parallel edge surfaces at 16 (see Figs. 2 and 3) normally held in the relative position shown in Fig. 2 by a spring 19. The spring is preferably formed of flat metal stock. The spring 19 is connected to a sleeve 20 on the shaft 6, and, as shown, is so shaped as to provide parallel arms 21 embracing between them the two brake shoes holding them in braking contact with the drum. The arms enter complementary notches 22 in peripheral portions of the brake shoes midway between the effective ends thereof so that the braking pressure of the shoes on the conical drum surface is uniform if the spring arms exert approximately equal inward force. The opposite end surfaces of the individual notches 22 serve as spline or key surfaces connecting the shoes 15 to the sleeve 20 through the intermediary of the spring arms. The sleeve may be fastened on the shaft 6 as by a set screw 23. The spring can be secured to a non-circular reduced portion 24 of the sleeve (see Fig. 4) at a complementary opening in the spring stock. The reduced portion can be riveted over as at 25, Fig. 1, to hold the spring and sleeve together.

The shoes 15, because of bearing on the conical surface 13 of the head 12, are urged by the spring in an endwise direction away from the shaft 6, thereby rendering effective the flat face braking contact between the shoes and drum at surface 14. When the conical portions of the shoes are separated from the fixed surface 13, the shoes can then move slightly endwise of the assembly to release the flat face braking contact. A further advantage of the conical form of braking members is to secure compactness along the working axis since frequently there is very little space afforded for the brake. If desired, the shoes can be molded to shape from any suitable plastic material, and, as shown in Figs. 1, 2 and 3, there are metal inserts 27 of angle section adjacent the center flat edge portions of the shoes so that respective flanges of the inserts lie close to each other and parallel in line with a through bore 28 of the fixed member 8.

For releasing the brake and turning the shoe, spring and sleeve assembly bodily, thereby to adjust the shaft 6 and (e. g.) the rotary condenser plate assembly relative to the fixed plate assembly, the arrangement described above requires only a flat tool like a screw driver and means to position the tool. As shown in Fig. 1, a conventional radio dial knob 30 has a pin 31 rigid therewith for entering the bore 28 as a guiding support. The inner end portion 32 of the pin is reduced and flattened so as snugly to enter between the adjacent parallel edge faces of the shoes, or inserts 27 thereof if used, in the normal or braking position of the shoes. Turning of the reduced end 32 spreads the shoes as shown in Fig. 3, as by pressure applied against the inserts 27. Because the operation is accomplished by relatively short effective lever arms (the two edge portions of the reduced flat end 32 of the pin 31 being close to the center of rotation) the braking pressure of the shoes is easily overcome without requiring much turning force on the knob. The brake releasing position of the shoes shown in Fig. 3 is exaggerated for illustrative purposes. Actually, the circular surfaces are only separated a few thousandths of an inch in order fully to release the shoes from fixed braking surfaces.

A spring detent 34 (e. g. cross wire) may be provided adjacent a peripheral groove 35 in the pin to retain the latter in position against being jarred out of place or accidentally removed. The operating pin does not require a large knob and in any event the pin can be so made as to be conveniently carried about in the pocket as a key. Special complementary configurations of the pin and bore can be employed to deter unauthorized tampering with the setting of the instrument or machine part controlled by the brake.

It would be possible to increase the number of brake shoes. For instance, three shoes could be used with a three-armed spring, in which event the inner end of the pin 31 would be triangular. This would increase expense and probably not be as satisfactory as the illustrated construction for there would then be some likelihood that the inner end of the pin would turn relative to the faces or edges of the shoes engaged thereby beyond the point necessary to turn the shoes in effecting adjustment of the part to which connected.

By reason of using flat spring arms such as 21 in contact with the shoes 15 at the notches 22 thereof as the driving connection between the shoes, there is practically no likelihood of play occurring in said driving connection due to wear. Moreover, the parallel flat faces of the spring arms always maintain the edge portions 16 of the shoes parallel to each other.

While it is of special advantage, as above explained, to use the spring arms 21 as driving elements for the part to be adjusted and locked by the mechanism, the arrangement can be further modified by using a spring for urging the shoes toward the fixed braking surfaces and means separate from the spring for drivingly connecting the shoes to said part.

Since the spring forces are concentrated on the shoes midway between their effective ends, and the pin or key (31, 32) bears with substantially equal force on both shoes, the shoes are released simultaneously, neither having any possibility of serving as a reactance for the other. The spring forces do not have to be equalized, a slight difference being immaterial to proper operation since the axis of the operating pin 31 is fixed. The brake releasing operation occurs, of course, irrespective of the direction in which the pin or key is turned.

In Fig. 5 the fixed braking member (drum 12) is shown as rigid with the body 40 of a key-controlled locking mechanism of a conventional type; and the shoes 15 are operated to release and turn them by the tumbler-controlled barrel 41 of the lock. The barrel has a reduced and flattened extension 43 for spreading the shoes in the manner above described. A removable key is indicated at 44 for turning the barrel 41.

I claim:

1. In the combination comprising a rotarily adjustable part and means for supporting the same; a fixed circular external braking surface, braking means connected to said part in a manner to turn it and having a radially movable internal braking surface bearing normally against said fixed surface to hold said part in adjusted position, and a rotarily supported adjusting device having a stem coaxial with the fixed braking surface and readily movable into and out of contact with a brake releasing portion of said braking means and cooperable with the braking means in a manner to release the braking pressure thereof and turn the braking means bodily when the adjusting device is turned, whereby to effect adjustment of the adjustable part.

2. In the combination comprising a rotarily adjustable unbalanced part and means for supporting the same; a fixed circular external braking surface, a plurality of radially movable internal brake shoes cooperable therewith and drivingly connected to the said part so that said part is turned only through the intermediary of the brake shoes, spring means normally tending to urge the shoes inwardly against the fixed braking surface, and rotarily supported adjusting means concentric with the fixed braking surface, engaging the brake shoes close to the common center of the braking surfaces and rendered operable when the adjusting means is turned to move the shoes away from the fixed braking surface and also to rotate the shoes about a common axis whereby to adjust said part.

3. Mechanism for purposes such as described and including a rotary part to be adjusted, said mechanism comprising a fixed braking member having a central bore and a circular braking surface coaxial with said bore, a rotary braking member normally bearing on said braking surface and drivingly connected with the rotary part so that the same is turned through the intermediary of the rotary braking member, and a rotatable releasing member having a guiding bearing in the bore of the fixed braking member, said releasing member and rotary braking member having portions arranged to engage each other upon turning of the releasing member while in said bore in a manner to release the braking pressure of the braking member and impart turning force to the rotary braking member, whereby to turn the part to be adjusted.

4. Braking mechanism for purposes such as described, comprising a fixed braking member having a frusto-conical head, a plurality of brake shoes with braking surfaces complementary to the conical surfaces of the head and normally bearing thereon and portions extending adjacent one end of the head in spaced relation to each other, means to couple the shoes drivingly to a part to be turned while enabling the shoes to spread apart, and an adjusting pin or key extending through an axial bore in the head and having a non-circular end portion engageable with the spaced portions of the shoes to release the shoes and cause them to be turned bodily.

5. Braking mechanism for purposes such as described, comprising a fixed brake drum having circular braking surfaces and a central bore coaxial therewith, a pair of brake shoe members complementary to the drum and having portions extending adjacent one end thereof close to each other, relatively overlapping the bore and having parallel edges, a spring having a pair of arms bearing inwardly on the shoes from respectively opposite directions and engaging peripheral notches in the shoes, said spring having means rigid therewith for attachment to a rotary part to be adjusted, and an adjusting member having a bearing in the bore of the drum and a reduced flat end adapted to enter between said parallel edges of the shoe members to release the shoes and turn them.

6. In the combination including a rotary condenser plate assembly and shaft, and an instrument panel with which said assembly is associated; a tubular member adapted to be fastened at one end to the inner surface of the panel in axial alignment with the condenser shaft, said member having a frusto-conical head diverging toward the condenser shaft, a pair of brake shoes normally bearing on the head, and means connecting the shoes to the shaft, said shoes having portions overlapping the bore of the tubular member at the inner end thereof beyond the head and having closely positioned parallel surfaces adjacent said bore, whereby the shoes can be released by a rotary part guided by the bore of the tubular member and having a flat end engageable with said parallel surfaces of the shoes.

ROGER F. HORTON.